BEARING ARRANGEMENT FOR ELECTRIC MOTORS

Original Filed Aug. 22, 1966

United States Patent Office

Re. 28,094
Reissued July 30, 1974

28,094
BEARING ARRANGEMENT FOR ELECTRIC MOTORS

Clinton A. Boyd, Tulsa, Okla., assignor to Borg-Warner Corporation, Chicago, Ill.

Original No. 3,506,861, dated Apr. 14, 1970, Ser. No. 574,093, Aug. 22, 1966. Application for reissue May 21, 1973, Ser. No. 362,026
Int. Cl. H02k *5/16*
U.S. Cl. 310—90 5 Claims

Matter enclosed in heavy brackets [ ] appears in the original patent but forms no part of this reissue specification; matter printed in italics indicates the additions made by reissue.

ABSTRACT OF THE DISCLOSURE

An elongated electric motor having a stator comprising a plurality of magnetic laminations. A rotor including a plurality of segments and a supporting shaft disposed within the stator. The rotor is supported by a plurality of spaced apart bearing assemblies which include a stationary journal supported by the stator and a sleeve which rotates with the shaft. The journal is made of a non-magnetic material having a resistivity of at least 100 microhms/cm.$^3$ when measured at 20 degrees centigrade.

Figure 1:
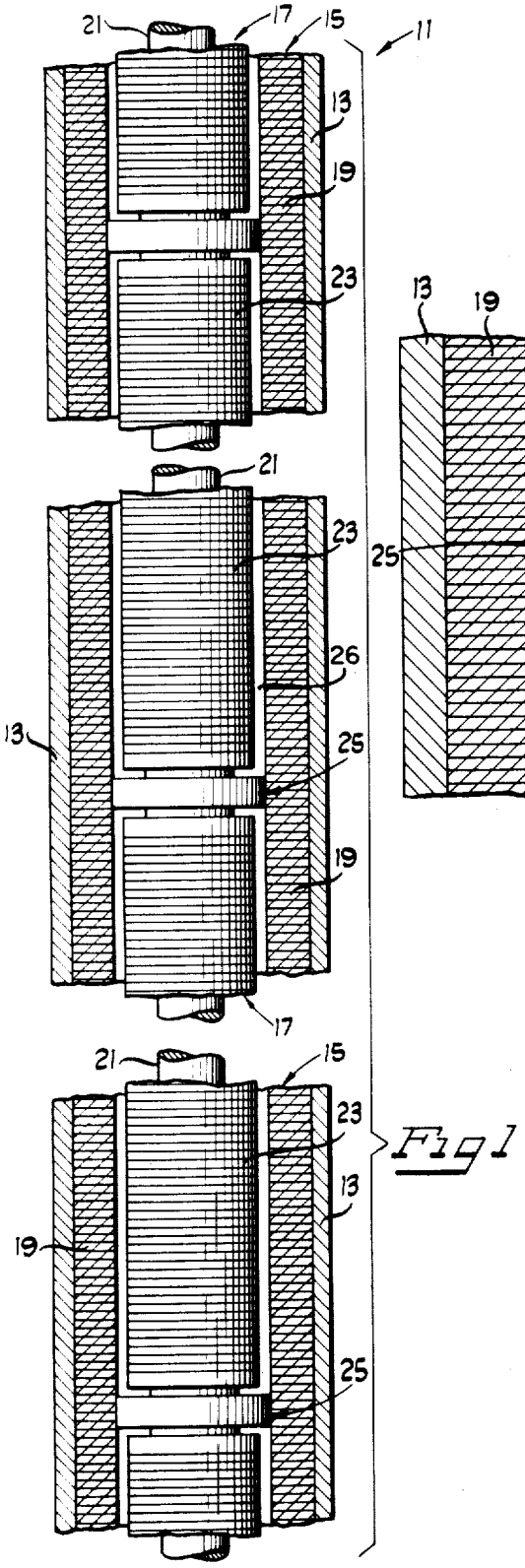

This invention relates to shaft bearing arrangements in electric motors. More particularly, it relates to shaft bearing arrangements associated with motors which are extremely long relative to their diameter, such as submersible electric motors as used in deep well pumps.

In a typical submersible deep well pump, drive shaft rotation is provided by an alternating current motor operatively associated with the pump and disposed near the bottom of the well. Due to the operational environment and the horsepower requirements of the pump, the motor must be constructed with a very large length to diameter ratio. For this reason, it has been found necessary to support the rotor shaft of the motor at regular intervals upon bearing assemblies. These bearings stabilize the rotor during motor operation, thus maintaining the proper spacing between the rotor and stator, and minimizing the necessary air gap between these elements to assure efficient motor operation.

The bearing assemblies normally used to support the rotor include sleeve portions secured to the shaft for rotation with the shaft, and stationary bearings or journals which surround the sleeve and retain the sleeve and rotor shaft in proper radial alignment. The stationary bearings are usually placed in the internal bore of the motor stator when the rotor is assembled into the stator. This retains the bearings in their proper position and prevents movement during motor operation.

An immediate problem which arises with the use of such a bearing assembly is the possibility of rotation of the stationary bearing element due to the effects of the rotating magnetic field produced by the motor stator. Such rotation causes over-heating of the bearing which in turn adds substantial heat to the entire motor assembly and results in significant loss of operating efficiency. Additionally, such rotation damages the motor stator and the stationary bearing element, requiring premature maintenance or replacement of these components.

This problem was recognized early in the construction of submersible pump motors and many attempts have been made to provide an effective solution. The most direct method has been to provide a stator core which is discontinuous in the areas which contact the stationary bearing elements. This was accomplished by including groups of non-magnetic laminations in the stator core assembly. In this manner, the magnetic field was interrupted at the bearing locations, and rotation of the stationary bearing element was prevented.

As can be readily appreciated, such an arrangement is expensive, and the assembly procedures required to construct the stator core are extremely time-consuming. It is obvious that the most efficient arrangement for the construction of the stator core would be to utilize a homogeneous arrangement of magnetic core laminations.

In order to provide this desirable arrangement, attempts have been made to prevent stationary bearing element rotation by the use of non-magnetic bearing material. In theory, a non-magnetic bearing would not be affected by the magnetic field of the stator and would, therefore, remain stationary during motor operation. In practice, however, it has been found that even with the use of non-magnetic bearing material, serious problems of stationary bearing element rotation have occurred. Thus, to date, the only effective way to eliminate such rotation has been the use of non-magnetic stator laminations in the bearing areas, and all commercial embodiments of submersible pumps have necessarily utilized this approach.

The reason that the use of non-magnetic stationary bearings has not effectively eliminated the problem is that factors in addition to the magnetic property of the stationary bearing element cause bearing rotation. In many metals, the presence of a strong magnetic field induces intermolecular currents commonly referred to as eddy currents. These eddy currents create heat in the material subjected to the magnetic field. Additionally, when the magnetic field to which the material is subjected is rotating, as in a motor, the eddy currents tend to cause the element disposed in the magnetic field to rotate also. Therefore, to provide a stationary bearing element which operates effectively in the magnetic field of the motor, it is necessary that it be formed not only of non-magnetic material, but also of a material which resists the inducement of internal eddy currents.

Accordingly, it is the principal object of the present invention to provide an improved bearing arrangement for use in elongated electric motors to provide support for the motor rotor at intervals along the length of the rotor shaft.

It is another object of the present invention to provide an improved bearing arrangement for rotor support at intervals along the length of the rotor shaft, wherein the motor stator may be made of a homogeneous grouping of magnetic laminations.

It is another object of the present invention to provide an improved bearing arrangement of the type described which eliminates the tendency of the sationary bearing element to rotate in the presence of the magnetic field established by the motor stator.

It is still a further object of the present invention to provide an improved bearing arrangement of the type described which includes a stationary bearing element which is constructed of non-magnetic material and which resists the establishment of eddy currents when subjected to the stator magnetic field.

These and other objects and advantages of the present invention will become apparent with reference to the following description and accompanying drawing.

Figure 2:
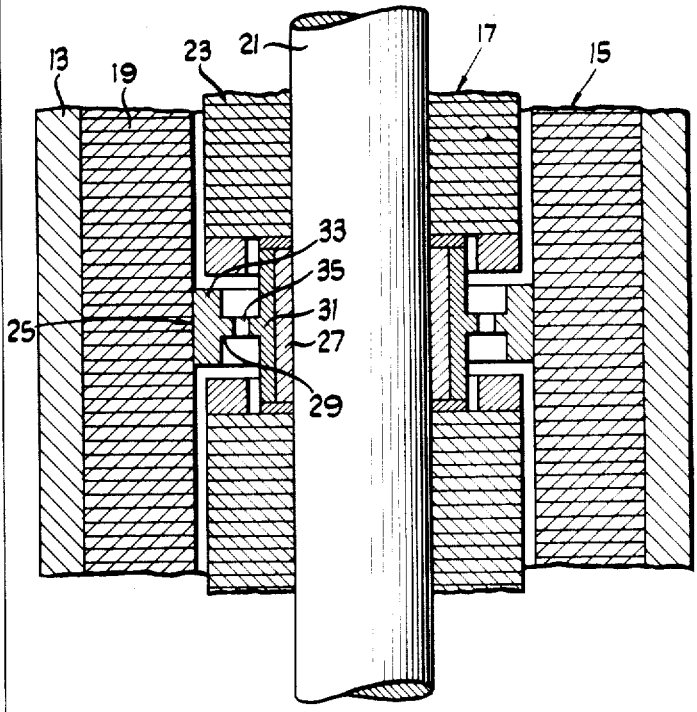

In the drawing:

FIGURE 1 is a fragmentary view of an elongated electric motor partly in section illustrating various of the features of the present invention; and FIGURE 2 is an enlarged view of a portion of the apparatus of FIGURE 1.

Very generally, the present invention relates to a non-magnetic bearing arrangement in an elongated electric motor which provides support for the motor rotor at intervals along its length and which operates satisfactorily in a magnetic field established by a motor stator constructed of a homogeneous grouping of magnetic laminations.

More particularly, and with reference to the drawings, there is shown an elongated electric motor generally designated 11 and illustrating the principles of the present invention. In the illustrated embodiment, the motor 11 includes a housing 13, a stator 15 and a rotor 17. The stator is composed of a plurality of laminations 19 formed of magnetic material. The stator is fixed to housing 13.

A rotatable shaft 21 extends beyond the ends (not shown) of the stator and may be provided with conventional radial and thrust bearings (also not shown). The shaft is concentric with the housing 13 and the stator 15, and provides a mounting for rotor 17.

A series of rotor sections 23 surround the shaft at axial intervals and are separated to allow sufficient space for an alternate series of bearing assemblies 25. The rotor sections-additionally have an outer diameter smaller than the inner dimension of stator 15 establishing an air gap 26 to allow axial flow of coolant from a source (not shown). The length of the shaft 21 is determined by the number of rotor sections required to provide a motor of adequate horsepower for the application in which it is to be used. The number of bearing assemblies 25 and their spacing is a function of the mechanical strength of the shaft, the air gap tolerance and other particular design parameters. The alternating rotor-bearing combination extends the length of stator 15.

As best seen in FIGURE 2, each of the bearing assemblies include a non-magnetic bushing or sleeve 27 appropriately fixed to shaft 21. The sleeve cooperates with a non-magnetic stationary bearing or journal 29 to support the rotor in proper radial alignment. The stationary bearing includes an internal ring portion 31 which slidably engages the sleeve allowing relative rotation between the sleeve and ring portion 31 as the sleeve rotates with the shaft 21.

An external ring portion 33 of the bearing 29 is secured to stator 15 and remains stationary relative to the stator. Connection between the bearing external ring 33 and stator 15 is effected by pressing the bearing into the internal diameter of the stator when the rotor is positioned in the stator during motor assembly.

A plurality of axial passageways 35 are also included in the bearing 29 to allow the continued axial flow of coolant.

In accordance with the present invention, the bearing 29 is constructed of a material which is not only non-magnetic, but is also resistant to the inducement of eddy currents when subjected to a magnetic field. To accomplish the latter, it is necessary that the material have a relatively high resistance to the flow of electrical current. This property, known as high resistivity, is essential to the use of stationary bearings of the type described in a motor having a homogeneous magnetic stator.

It has been found that the resistivity of the material used must be at least 100 microhms/cm.$^3$ (when measured at 20° C.). Above this level, resistance to the inducement of electrical current in the bearing is adequate to prevent excessive heat generation and bearing rotation.

One material that has been found to possess the essential qualities of insensitivity to magnetism (i.e. low permeability) and resistance to the establishment of eddy currents (i.e. high resistivity) is a material produced by the International Nickel Company under the trade name "Ni Resist" iron. This material is an alloy of iron containing nickel, copper and, chromium.

One form of "Ni Resist" iron found particularly suitable for use in the bearing journal 29 is "Ni Resist" Type II. It is a cast iron alloy containing about 18.0 to 22.0 percent nickel, about .50 percent copper, and about 1.75 to 2.50 percent chromium. This material has a permeability of 1.03 (compared to 125 for gray cast iron) and a resistivity of 130–170 microhms/cm.$^3$ at 20° C. (compared to 75–100 for gray cast iron).

Another cast iron alloy found to operate satisfactorily includes about 3 percent carbon, about 13.5 to 17.5 percent nickel, about 5.5 to 7.5 percent copper, and about 1.75 to 2.50 percent chromium.

In tests on a variety of bearing materials, it was found that certain materials, even though non-magnetic, did not operate satisfactorily if their resistivity fell below the above-mentioned value. Among the materials tried were aluminum (resistivity 2.8 microhms/cm.$^3$ at 20° C.) and brass (resistivity 6.21 microhoms/cm.$^3$ at 20° C.).

Therefore, it is believed that to eliminate effectively the sensitivity of the bearing journal 29 to the presence of the magnetic field of the stator 15, the bearing must be constructed of a material that is non-magnetic and additionally possesses a high resistivity to electrical current, specifically a resistivity in excess of 100 microhms/cm.$^3$ measured at 20° C.

[While certain specific iron alloys have been described, any suitable material such as carbon, plastic, or non-ferrous metals possessing the necessary properties described may be used.]

Various of the features of the invention have been particularly shown and described. However, it should be obvious to one skilled in the art that numerous modifications may be made without departing from the spirit and scope of the invention.

What is claimed is:

1. An elongated electric motor comprising a housing, a homogeneous stator composed of a plurality of magnetic laminations and mounted in said housing, a shaft, a rotor which includes a plurality of spaced apart rotor sections mounted on said shaft, said shaft rotatably mounted within said stator, a plurality of spaced apart bearing assemblies between adjacent rotor sections and supporting said shaft; each of said bearing assemblies including a stationary journal which engages said stator, said journal being composed of a non-magnetic *metallic* material having a resistivity of at least 100 microhms/cm.$^3$ measured at 20° centigrade.

2. An elongated electric motor as claimed in claim 1 wherein each of said bearing assemblies includes a sleeve secured to said shaft, each of said journals including an internal ring portion which slidably engages said sleeve and an external ring portion which engages said stator, each of said stationary journals further including means defining at least one axial passageway between said internal portion and said external portion.

3. An elongated electric motor as claimed in claim 1 wherein each of said stationary journals is composed of a cast iron alloy.

4. An elongated electric motor as claimed in claim 1 wherein each of said stationary journals is composed of a cast iron alloy containing about 18 to 22 percent nickel, about .50 percent of copper, and about 1.75 to 2.50 percent chromium.

5. An elongated electric motor as claimed in claim 1 wherein each of said stationary journals is composed of a cast iron alloy containing about 3 percent carbon, about 13.5 to 17.5 percent nickel, about 5.5 to 7.5 percent copper, and about 1.75 to 2.50 percent chromium.

References Cited

The following references, cited by the Examiner, are of record in the patented file of this patent or the original patent.

UNITED STATES PATENTS

| | | | |
|---|---|---|---|
| 3,249,427 | 5/1966 | Walp | 75—125 |
| 3,112,417 | 11/1963 | Tamm | 310—90 |
| 3,123,730 | 3/1964 | Fagel | 310—90 |
| 1,867,018 | 7/1932 | Merica et al. | 75—125 |
| 2,315,917 | 4/1943 | Arutunoff | 310—87 |
| 2,568,548 | 9/1951 | Howard et al. | 310—87 X |
| 3,249,427 | 5/1966 | Walp | 75—125 X |

OTHER REFERENCES

Standard Handbook for Electrical Engineers, Knowlton, 8th edition, 1949, p. 344.

R. SKUDY, Primary Examiner